July 2, 1940.　　H. L. BOWERS ET AL　　2,206,474
AIRPLANE CONTROL COLUMN
Filed Dec. 30, 1938　　2 Sheets-Sheet 1
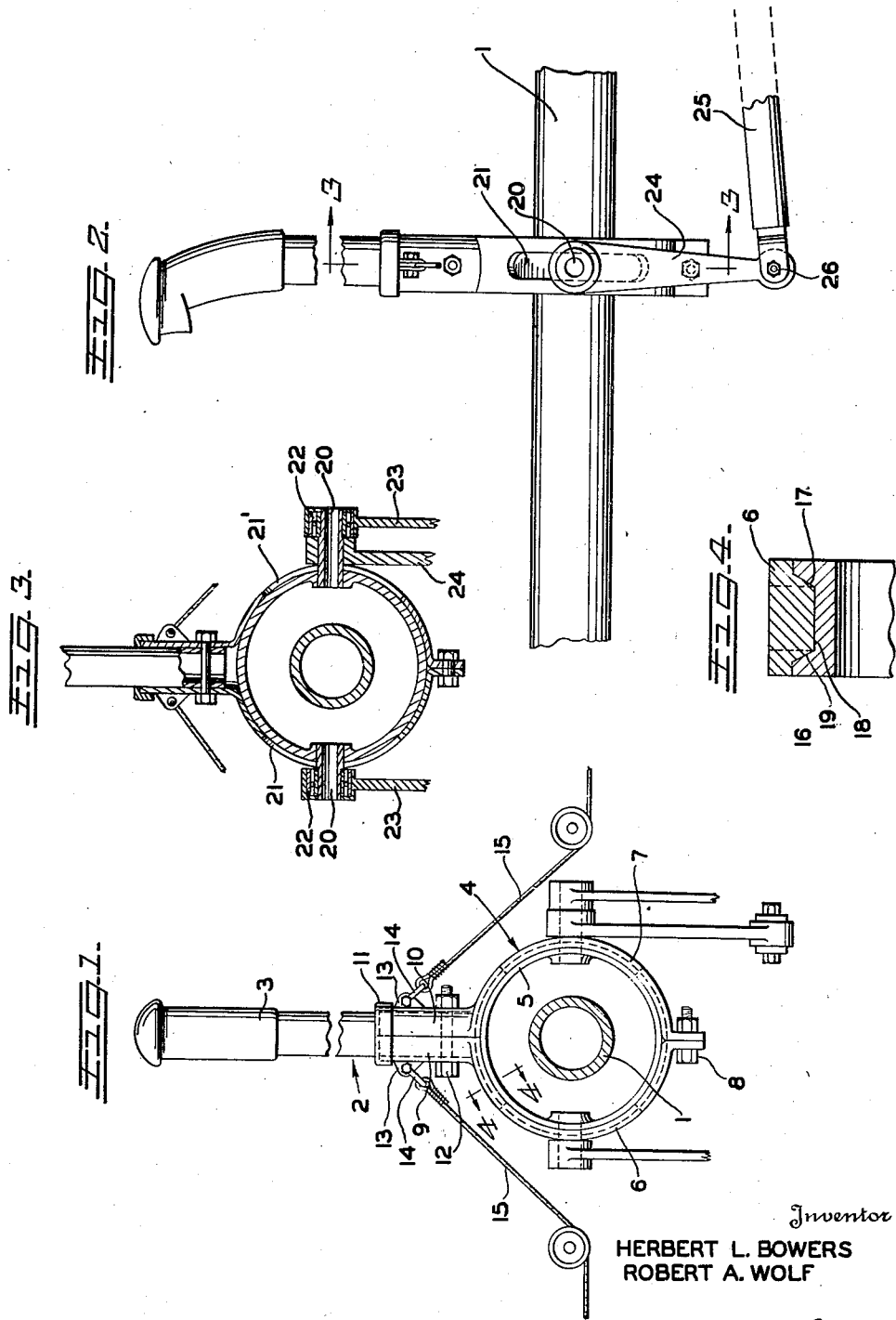
Inventor
HERBERT L. BOWERS
ROBERT A. WOLF
Attorney

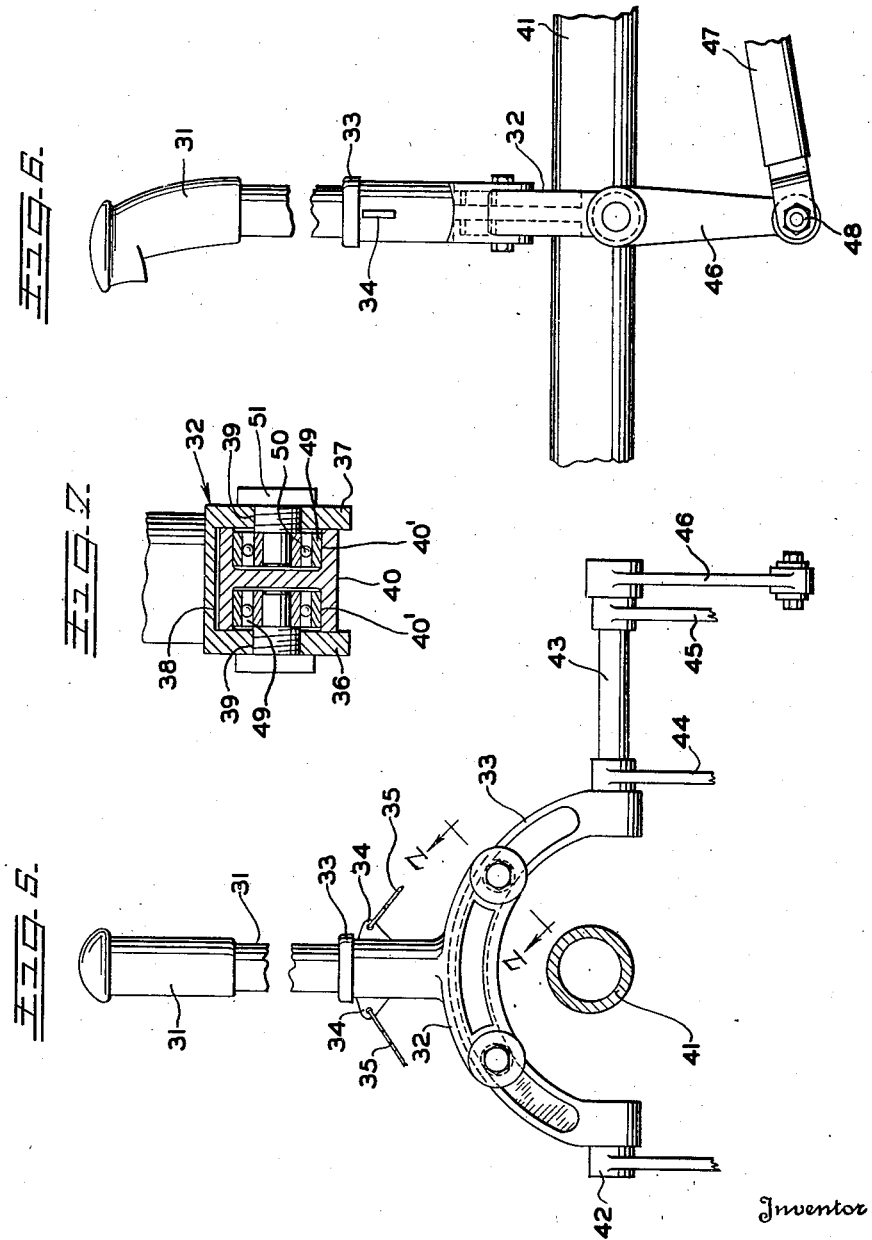

Patented July 2, 1940

2,206,474

UNITED STATES PATENT OFFICE 2,206,474

AIRPLANE CONTROL COLUMN

Herbert L. Bowers and Robert A. Wolf, Kenmore, N. Y., assignors to Bell Aircraft Corporation, Buffalo, N. Y., a corporation of New York Application December 30, 1938, Serial No. 248,640

6 Claims. (Cl. 244—83)

Our invention relates to control columns, and more especially to a column designed for use in an airplane in which the normal position of the control column is located between the power plant and the propeller so that the power shaft would pass through the plane of the control column and would normally intersect the column.

It is apparent that in this type of airplane the problem is to provide a control column that can be freely operated without coming into contact with the power shaft.

An object of this invention is to provide a control column for the type of airplane described which is so constructed that it may be freely operated when located in its normal position.

A further object of our invention is to provide a control column which is simple in construction and efficient in operation.

With these and other objects in view, our invention embraces generally the concept of providing a control column, the lower portion of which is so constructed that it is capable of a free universal movement without contacting a power shaft which passes through the same plane as its lower section.

In this application we have shown two modifications of this invention. In the first modification, the control stick is mounted on a grooved ring which encircles the drive shaft. In the second form the control column is mounted on a bracket provided with arcuate slots.

By means of either of these constructions, all possibility of interference with the power shaft due to moving of the control stick is eliminated.

In the drawings:

Figure 1 is a front view in elevation of the control column, partly broken away, and its associated mechanism.

Figure 2 is a side view in elevation of the device shown in Figure 1.

Figure 3 is a longitudinal, sectional view taken along line 3—3 of Figure 2.

Figure 4 is a view taken along line 4—4 of Figure 1, looking in the direction of the arrows.

Figure 5 is a front view in elevation of the modification of the control column shown in Figure 1 and its associated mechanism.

Figure 6 is a side view in elevation of the device shown in Figure 5.

Figure 7 is a view taken along line 7—7 of Figure 5, looking in the direction of the arrows.

Referring to the drawings, and more particularly to Figures 1 and 2, there is shown a power shaft 1 which passes through our novel control column, designated generally by the numeral 2. This column 2 is comprised of a grip member 3, a base member 4, and a cutaway member 5 which is circular in shape and encircles the shaft 1 and is mounted in such a manner that it does not come in contact with the shaft 1 when the control column is operated.

The base member 4 comprises a split member composed of similar halves 6 and 7 which are semi-circular in shape and are bolted together at their lower extremities as shown at 8. The upper portions of the split members carry semi-cylindrical extensions 9 and 10 which, when the members 6 and 7 are bolted together, form a socket in which is mounted the grip member 3. A collar 11 is provided to form a rigid fit.

A bolt or the like extends through aligned apertures in the extensions 9 and 10 to hold these members in proper position, as shown at 12. An ear 13 is formed integrally with each of the cylindrical extensions 9 and 10 to which are attached shackles 14 attached to aileron control cables 15.

As best shown in Figure 4, the inner periphery of the members 6 and 7 is provided with a tongue 16, which is provided with shoulders 17. This tongue is slidably fitted in a groove 18, provided with shoulders 19, which is formed in the outer periphery of the ring 5.

As best shown in Figure 3, the ring 5 is rigidly attached to trunnions 20. These trunnions extend in opposite directions through slots 21 and 21' which are provided in the split members 6 and 7 and are journaled in roller bearings 22 which are fitted in supporting arms 23. These arms are connected to the fuselage structure in any suitable manner.

A crank 24 is rigidly mounted on one of the trunnions 20 at a point located between the base member 4 and one of the bearings 22. The lower extremity of the crank 24 is attached to the push-pull rod 25 of an elevator control by a pivotal connection, such as shown at 26.

In operation, a transverse movement of the grip member 3 will cause a rotary movement of the base member 4 on the periphery of the inner ring 5. This free movement of the base member 4 and the crank 24 in relation to the trunnions 20 is possible because the trunnions 20 are freely movable in the slots 21' and 21. In this manner, tension may be exerted on either of the connecting cables 15 which results in a raising of one aileron of the airplane and the lowering of the other.

If, on the other hand, the grip member 3 is moved in a fore or aft direction, the shoulders 17 on the tongue 16 impart a corresponding movement to the ring member 5 through the shoulders 19. This pressure imparts a rotative movement to the trunnions 20 and results in a movement of the crank 24. The movement of the crank 24 causes a corresponding lineal motion in the push-pull rod 25 which results in a lowering or raising of the elevators of the airplane. If desired, both a fore and aft and a transverse motion may be imparted simultaneously to the control mechanism by operation of the grip member 3. In this event, the positions of both the aileron surfaces and the elevators are affected.

In the modification of our invention which is shown in Figure 5 and the subsequent figures, the control column 30 comprises a grip member 31 which is mounted in a socket formed in the upper portion of a base member 32. A collar 33 is provided to fit over the socket, and opposed ears 34 are also provided which are connected to the cables 35 which operate the aileron surfaces.

The base member 32 comprises a saddle and is bifurcated into two portions 36 and 37 which combine to form a groove 38 and are provided with screw-threaded apertures 39.

The base member 32 is mounted on a cutaway member 40, which is in the form of a bridge with opposed arcuate slots 40', which is semi-circular in shape, and is mounted above and partly encircles the drive shaft 41. One extremity of this bridge 40 is movably mounted on a support 42 and the other extremity is rigidly mounted on one end of a shaft 43 which is journaled in bearings carried by supports 44 and 45. The supports 42 and 44 and 45 are attached to the fuselage structure of the airplane in any suitable manner.

Mounted on the opposite end of the shaft 43 is a crank 46 which is attached to a push-pull rod 47 in any suitable manner such as the bolt arrangement shown at 48. The push-pull rod 47 controls the elevator surfaces of the airplane.

As best shown in Figure 7, the saddle 32 fits over the bridge 49 in such a manner that the sides 36 and 37 bear against opposite sides of the bridge member 40. The saddle 32 is supported by rollers 49 which are carried within the slots 40' and are mounted on roller bearings 50 which are supported on screw-threaded shafts 51. These shafts 51 are mounted in the screw-threaded apertures 39.

In operation, a transverse movement of the grip member 31 will result in a movement of the base member 32 along the arcuate slots 40' of the bridge member 40, which results in an increase in tension on one of the cables 35. This movement results in the raising of one aileron of the airplane and the lowering of the other. If, on the other hand, the grip member 31 is moved in a fore or aft direction, the position of the bridge member 40 will be changed due to the pressure of the shoulders 36 and 37. This movement of the bridge 40 will cause a rotative movement of the shaft 43, thereby causing a movement of the crank 46 and a corresponding movement of the push rod 47. This movement of the push rod 47 will affect the position of the elevators of the airplane.

If desired, both a fore and aft and a transverse motion may be simultaneously imparted to the control mechanism by a suitable movement of the grip member 31. In this event, the positions of both types of control surfaces will be affected. During the fore and aft movement, the bridge member 40 does not come in contact with the drive shaft 41. Therefore, the operation of this shaft is not affected in any way.

It is believed apparent from the above description that we have provided two control columns, which although not limited to any particular type of airplane, are especially adaptable for use in a plane in which the drive shaft passes through the plane ordinarily occupied by the control column mechanism. Such a design often becomes necessary in the construction of airplanes because of the desirability of placing the power unit in the center of gravity of the airplane so as to increase the maneuverability. After the proper location for the power plant has been determined, the power shaft is extended through the fuselage construction in either direction depending upon whether an airplane of the tractor or pusher type is desired. Besides the advantages outlined above the control columns which form the basis of this invention are efficient in operation, economical in construction, and are easily assembled.

While for purposes of illustration we have described these inventions in connection with an airplane in which the power unit is so mounted that the power shaft passes through the plane normally occupied by the control columns, it is, obvious, that these control columns may be used in any type of airplane. Moreover, various changes could be made in the specific construction and various mechanical equivalents used without departing from the spirit of this invention. For these reasons, we wish this invention only to be limited by the prior art and the scope of the appended claims.

We claim:

1. In an airplane, a control column comprising a grip member, a base member, and a cutaway member provided with slots, said base member being movably mounted in said slots.

2. In an airplane having elevator and aileron control surfaces, a control column comprising a grip member, a base member which is operatively connected to the ailerons, and a cutaway member provided with arcuate slots which is operatively connected to the elevator surface, said base member being movably mounted on rollers within the said slots in such a manner as to be capable of a transverse movement.

3. In an airplane, a control column comprising a grip member, a base member provided with a groove, and a cutaway member provided with slots which are located in opposite sides of the cutaway member, the groove in the base member being designed to enclose the said slots, and means to movably mount the said base member in the said slots.

4. In an airplane, a control column comprising a grip member, a base member provided with a groove, and a cutaway member provided with slots which are located in opposite sides of the cutaway member, the groove in the base member being designed so as to enclose the said slots, means to movably mount the said base member in the said slots, and rollers carried by the said slots and attached to the said base member.

5. In an airplane having elevator and aileron surfaces, a control column comprising a ring-shaped cutaway member provided with trunnions rigid therewith, and means for connecting the member to one set of control surfaces, said member being provided with a groove in its outer periphery, and a circular base which is provided with a flange on its inner periphery and is operatively connected to a second set of control surfaces, said base being provided with apertures through which the trunnions extend and being movably mounted on said cutaway member in such a manner that the said flange engages the said groove.

6. In an airplane having elevator and aileron surfaces, a control column comprising a grip member, a circular cutaway member rigidly mounted on a pair of opposed trunnions, said trunnions being operatively connected to the elevator surfaces, and said member being provided with a groove in its outer periphery, and a circular base member which is provided with a flange in its inner periphery and is operatively connected to the aileron surfaces, said base member being provided with opposed slots through which the trunnions extend and being movably mounted on said cutaway member in such a manner that the flange engages the said groove.

HERBERT L. BOWERS.
ROBERT A. WOLF.